United States Patent
Chen (10) Patent No.: US 8,950,663 B2
(45) Date of Patent: Feb. 10, 2015

(54) DISPLAY ELECTRONIC TAGGING AND SETTING MANAGEMENT METHOD THEREOF

(71) Applicant: AniCa Corporation, New Taipei (TW)

(72) Inventor: Chao-Chin Chen, Hsinchu (TW)

(73) Assignee: Anica Corporation, New Taipei (TW)

( * ) Notice: Subject to any disclaimer, the term of this patent is extended or adjusted under 35 U.S.C. 154(b) by 0 days.

(21) Appl. No.: 13/888,801

(22) Filed: May 7, 2013

(65) Prior Publication Data

US 2013/0292463 A1    Nov. 7, 2013

(30) Foreign Application Priority Data

May 7, 2012    (TW) .................................. 101116243
Apr. 10, 2013  (TW) .................................. 102112708

(51) Int. Cl.
*G06F 17/00*    (2006.01)
*G06K 19/08*    (2006.01)
*G06K 19/077*   (2006.01)

(52) U.S. Cl.
CPC ........ *G06K 19/083* (2013.01); *G06K 19/07707* (2013.01); *G06K 19/077* (2013.01)

USPC ........... 235/375; 235/383; 235/385; 235/454; 235/487

(58) Field of Classification Search
USPC .......................... 235/375, 383, 385, 454, 487; 40/642.02; 345/85
See application file for complete search history.

(56) References Cited

U.S. PATENT DOCUMENTS

2007/0024551 A1* 2/2007 Gelbman ..................... 345/85
2010/0088937 A1* 4/2010 Lee et al. ................ 40/642.02

* cited by examiner

Primary Examiner — Kristy A Haupt
(74) Attorney, Agent, or Firm — Rabin & Berdo, P.C.

(57) ABSTRACT

A display electronic tagging and a setting management method thereof are provided. The display electronic tagging comprises a wireless RF module, a display, an encapsulant and a bar code. The wireless RF module is used for receiving a wireless RF signal. The display is electrically connected to the wireless RF module, and used for showing a price of a product. The encapsulant encapsulates the wireless RF module and the display, wherein the display is exposed form the encapsulant. The bar code is located at the encapsulant. A setting module pairs the bar code and the wireless RF module according to a barcode identification signal and a RF identification signal, such that the wireless RF module and the barcode together correspond to the same product.

17 Claims, 5 Drawing Sheets

| product name | code | wireless RF module |
|---|---|---|
| A1 | T1 | T2 |
| A2 | | |
| . . . | . . . | . . . |

DISPLAY ELECTRONIC TAGGING AND SETTING MANAGEMENT METHOD THEREOF

This application claims the benefit of Taiwan application Serial No. 101116243, filed May 7, 2012, and claims the benefit of Taiwan application Serial No. 102112708, filed Apr. 10, 2013, the subject matters of which are incorporated herein by reference.

BACKGROUND OF THE INVENTION

1. Field of the Invention

The invention relates in general to a display electronic tagging and a setting management method thereof, and more particularly to a display electronic tagging using a wireless technology and a setting management method.

2. Description of the Related Art

A conventional display electronic tagging comprises a display device, a controlling chip and a battery. The controlling chip can control the display device to display a product price, and the battery supplies the controlling chip and the display device with a required power.

However, when electric power of the battery is exhausted, it is inconvenient to replace the battery of the display electronic tagging. Much time is consumed for replacing a large number of display electronic tagging. In addition, the state of electric power of the battery in each display electronic tagging is different according to the usage condition of the battery; accordingly, for user, managing several the display electronic tagging becomes a burden.

SUMMARY OF THE INVENTION

The invention is directed to a display electronic tagging and a setting management method thereof, in an embodiment, a built-in battery is not required, and thus the replacement for the battery can be avoided.

According to an embodiment of the present invention, a display electronic tagging is provided. The display electronic tagging comprises a wireless RF module, a display device, an encapsulating body and a bar code. The wireless RF module is for receiving a RF signal. The display device electrically connects to the wireless RF module for displaying a price for a product. The encapsulating body encapsulates the wireless RF module and the display device, wherein the display device is exposed from the encapsulating body. The bar code is formed on the encapsulating body. After the bar code and the wireless RF module pair according to a bar code recognition signal and a wireless RF module recognition signal, the wireless RF module and the bar code corresponds the same product.

According to another embodiment of the present invention, a display electronic tagging is provided. The display electronic tagging comprises an electronic system, an encapsulating body and a bar code. The electronic system comprises wireless RF module, a display device, a display circuit, a power generator and a capacitor. The wireless RF module is for receiving a RF signal. The display device electrically connects to the wireless RF module for displaying a price for a product. The display circuit is electrically connected to the display device. The power generator is electrically connecting the display circuit and the wireless RF module and generating electricity by the RF signal. The capacitor stores the electricity generated by the power generator for providing the display circuit with the stored electricity, such that the flexible display displays a frame, wherein the capacitance of the capacitor ranges between 0.1 and 20 microfarads (mF). The encapsulating body encapsulates the wireless RF module and the display device, wherein the display device is exposed from the encapsulating body. The bar code is formed on the encapsulating body. After the bar code and the wireless RF module pair according to a bar code recognition signal and a wireless RF module recognition signal, the wireless RF module and the bar code corresponds the same product.

According to an embodiment of the present invention, a setting management method of a display electronic tagging is provided. The setting management method comprises the flowing steps. providing a display electronic tagging, wherein the display electronic tagging comprises a wireless RF module, a display device, an encapsulating body and a bar code, the wireless RF module is used for receiving a RF signal, the display device is electrically connected to the wireless RF module for displaying a price for a product, the encapsulating body encapsulates the wireless RF module and the display device, the display device is exposed from the encapsulating body, and the bar code is formed on the encapsulating body; and pairing the bar code and the wireless RF module according to a bar code recognition signal and a wireless RF module recognition signal, such that the wireless RF module and the bar code correspond the same product.

According to another embodiment of the present invention, a setting management method of a display electronic tagging is provided. The setting management method comprises the flowing steps. providing a display electronic tagging, wherein the display electronic tagging comprises an electrically system, an encapsulating body and a bar code, the electrically system comprises a wireless RF module, a display device, a display circuit, a power generator and a capacitor, the wireless RF module is used for receiving a RF signal, the display device is electrically connected to the wireless RF module for displaying a price for a product, the display circuit is electrically connected to the display device, the power generator electrically connects the display circuit and the wireless RF module, the encapsulating body encapsulates the electronic system and exposes the display device, and the barcode is formed the encapsulating body; pairing the bar code and the wireless RF module according to a bar code recognition signal and a wireless RF module recognition signal, such that the wireless RF module and the bar code correspond the same product; and the power generating electricity by the RF signal within a time interval of the display electronic tagging inducting with an exterior reader and the capacitor storing the electricity generated by the power generator for providing the display circuit with the stored electricity, such that the flexible display displays a frame, wherein the capacitance of the capacitor ranges between 0.1 and 20 mF.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
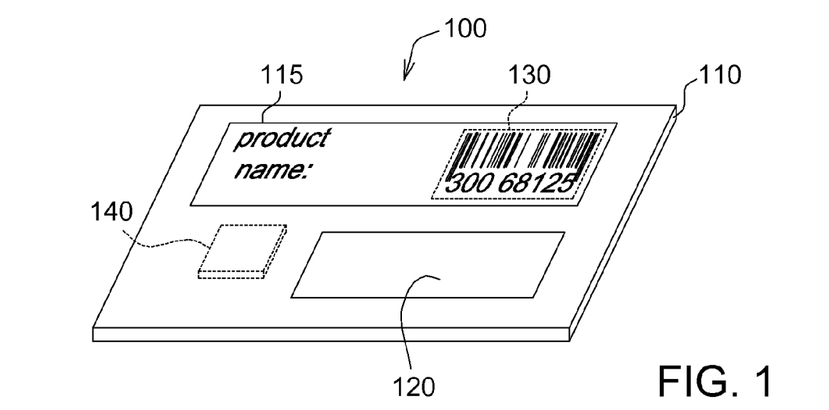
FIG. 1 shows an external view of a display electronic tagging according to an embodiment of the invention.

Referring to FIG. 1, an external view of a display electronic tagging according to an embodiment of the invention is shown. The display electronic tagging 100 comprises an encapsulating body 110, a display device 120, a bar code 130 and a wireless RF module 140.

The encapsulating body 110 encapsulates the wireless RF module 140 and the display device 120 for protecting the wireless RF module 140 and the display device 120.

The encapsulating body 110 is card body or cover body, for example. When the encapsulating body 110 is card body, the encapsulating body 110 is made from PVC. When the encapsulating body 110 is cover body, the encapsulating body 110 may comprise an upper cover and a lower cover. The display device 120, the bar code 130 and the wireless RF module 140 are accommodated between the upper cover and the lower cover.

In present embodiment, the encapsulating body 110 is flexible, such that the display electronic tagging 100 becomes a flexible display electronic tagging. In another embodiment, the encapsulating body 110 is hard encapsulating body, such that the display electronic tagging 100 becomes an inflexible display electronic tagging.

In present embodiment, the shape of the encapsulating body 110 is rectangle. In another embodiment, the shape of the encapsulating body 110 is such as a circular shape, an elliptic shape, or a polygonal shape. The encapsulating body 110 is fully transparent card body or a partially transparent card body, such that a display frame of the display device 120 is exposed from the encapsulating body 11.

As illustrated in FIG. 1, the display electronic tagging 100 further comprises a product tag 115 disposed on the encapsulating body 110. In present embodiment, the product tag 115 is display product name. The display product name is formed by printing or written by hand, for example. In another embodiment, the product tag 115 can be a product pattern. Due to the product pattern, even if the display electronic tagging 100 is not disposed on a right position of a real product, the real product can be found according to information shown in the product tag 115.

The bar code 130 is formed in an outer surface of the encapsulating body 110. In present embodiment, the bar code 130 can be 2D barcode. In another embodiment, the bar code 130 can be 3D barcode.

In present embodiment, the bar code 130 is printed in the product tag 115. In another embodiment, the bar code 130 can be printed in another product tag, and then be pasted on the encapsulating body 110. Alternatively, the bar code 130 can be directly printed in the encapsulating body 110, in this case, the product tag 115 can be omitted.

Figure 2:
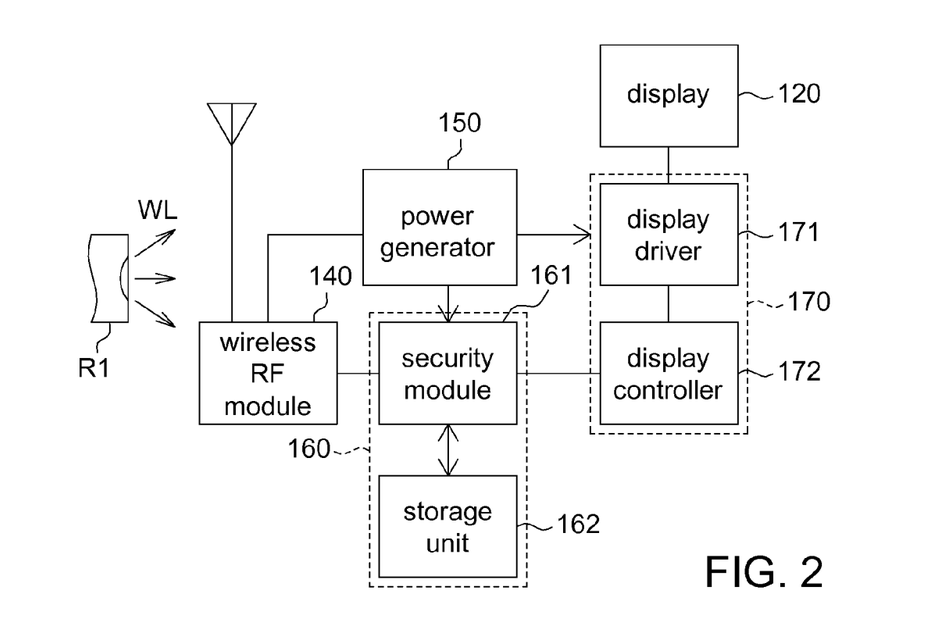
FIG. 2 shows a function block diagram of the display electronic tagging of FIG. 1.

Referring to FIG. 2, a function block diagram of the display electronic tagging of FIG. 1 is shown.

The display device 120 is electrically connected to the wireless RF module 140. The display device 120 can be a flexible display device or an inflexible display device. When display device 120 is flexible display device, the display device 120 can be bent with the bend of the encapsulating body 110, such that the function of the display device 120 doesn't be negative affected.

The display device 120 such as has bi-stability or multi-stability, such that the flexible display device 110 can permanently or temporarily maintain the display content in the absence of power supply. For example, the display device 120 is realized by such as an electrophoretic display, a cholesterol liquid crystal display, a liquid crystal display, a bi-stable display or a multi-stable display. The display device 120 can further be realized by such as a flexible organic light-emitting diode (OLED) display, a flexible light emitting diode (LED) display or a flexible liquid crystal display. Additionally, the flexible display device 410 can further be realized by segment type, dot matrix type or pattern type.

As illustrated FIG. 2, the wireless RF module 140 is used for receiving a RF signal WL from RF module reader R1. The wireless RF module 140 is realized by the contactless mode, and the dual interface mode. The wireless RF module 140 is conformed to such as the ISO7816 standard, the ISO/IEC14443 A/B standard, the ISO15693 standard, the ISO/IEC18000-3 standard, the EMV standard, the EMV Contactless standard, the MiFare standard or the ISO/IEC 18092 NFCIP-1 standard.

As illustrated FIG. 2, the display electronic tagging 100 further comprises a power generator 150 which is electrically connected to the display device 120, a smart card integrated circuit 160 and a display circuit 170. The power generator 150 receives the RF signal WL through the wireless RF module 140, and generates electricity (not illustrated) to supply the display electronic tagging 100 (such as the smart card integrated circuit 160, the component) according to RF signal WL (through principle of electromagnetic induction), such that the display electronic tagging 100 can normally work. As a result, the display electronic tagging 100 can work normally in the absence of the battery and avoid replacing the battery.

Although not illustrated, the power generator 150 further comprises a DC/DC converter (not illustrated) which converts a direct current (DC) into a working voltage required by the display circuit 170.

The smart card integrated circuit 160 executes security verification, and only when the security verification is successful, the wireless RF module 140 is allowed to communicate with the display circuit 170 via the smart card integrated circuit 160. The smart card integrated circuit 160 comprises a security module 161 and a storage unit 162. The security module 161 executes a security verification to prevent the invasion of the hackers, and only when the security verification is successful, the data of the storage unit 162 is accessed.

As illustrated FIG. 2, the display circuit 170 connects the display device 120, and comprises a display driver 171 and a display controller 172. The display driver 171 is connected to the display device 120, and used for driving the display device 120. The display controller 172 is connected to the display driver 171 and the smart card integrated circuit 160, and used for controlling the display driver 171. The electricity required by the display controller 172 is provided from the electricity the power generator 150, and is sufficient for the display device 120 to display frames.

Figure 3:
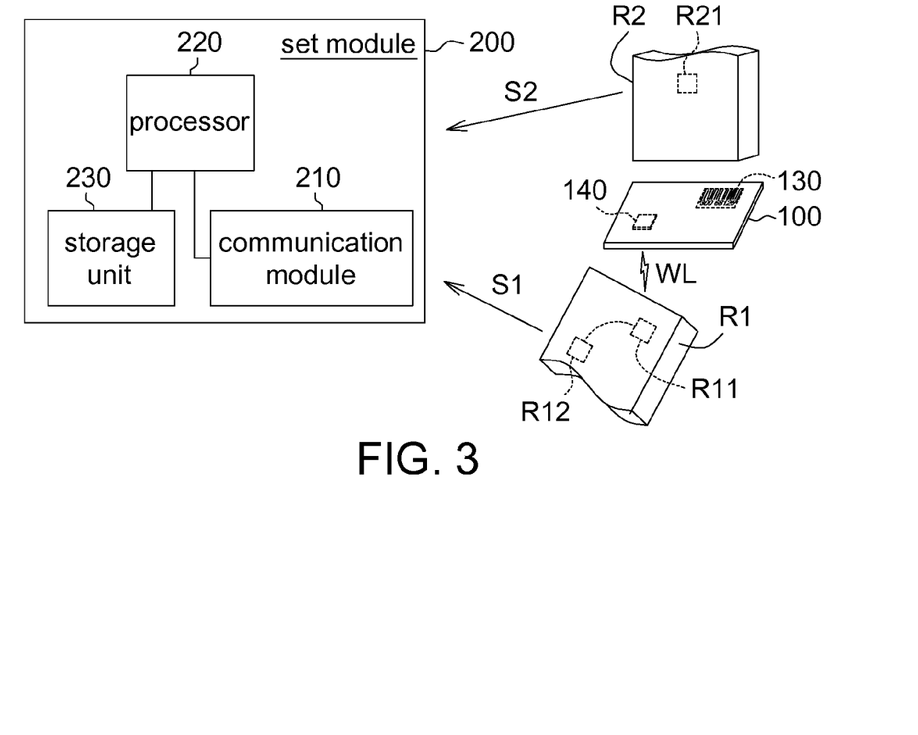
FIG. 3 shows a setting process diagram of the display electronic tagging of FIG. 1.

Referring to FIG. 3, a setting process diagram of the display electronic tagging of FIG. 1 is shown.

Firstly, the display electronic tagging 100 is provided.

Then, the set module 200 pairs the barcode 130 and the wireless RF module 140 according to a wireless RF module recognition signal S1 and a bar code recognition signal S2, such that the wireless RF module 140 and the barcode 130 correspond the same product.

The wireless RF module recognition signal S1 is generated by the RF reader R1 according to information provided by the wireless RF module 140. The wireless RF module recognition signal S1 contains relative information of the wireless RF module 140, such as a unique identification (ID) of the wireless RF module 140. The bar code recognition signal S2 is generated by the barcode reader R2 according to information provided by the bar code 130. The bar code recognition signal S2 contains relative information of the bar code 130, such as a unique identification of the bar code 130.

In present embodiment, the set module 200 may be disposed on a back-end sever (not illustrated). In another embodiment, the set module 200 may be disposed on one of the RF reader R1 and the barcode reader R2. In addition, the set module 200 comprises a communication module 210, a processor 220 and the storage unit 230. In present embodiment, the communication module 210 is wireless communication module. In another embodiment, the communication module 210 is a wire communication module. The communication module 210 can receive the wireless RF module recognition signal S1 and the bar code recognition signal S2, and then transmits the wireless RF module recognition signal S1 and the bar code recognition signal S2 to the processor 220. The processor 220 pairs the bar code 130 and the wireless RF module 140, such that the wireless RF module 140 and the bar code 130 correspond to the same product.

As illustrated FIG. 3, for example, after the barcode reader R2 may first read bar code 130, and then transmit the bar code recognition signal S2 to the set module 200; then, the RF reader R1 approaches the display electronic tagging 100; then, the wireless RF module 140 transmits the wireless RF module recognition signal S1 to the set module 200; then, the set module 200 pairs the bar code 130 and the wireless RF module 140, such that the bar code 130 and the wireless RF module 140 correspond to the same product. In another embodiment, the step of the barcode reader R2 reading the bar code 130 can be excused after the step of the RF reader R1 approaching the display electronic tagging 100 and the step of the wireless RF module 140 transmitting the wireless RF module recognition signal S1 to the set module 200.

As described above, the RF reader R1 and the barcode reader R2 can communicate with the display electronic tagging 100 in the absence of communicating with the product itself (such as a barcode in the product). In present embodiment, the RF reader R1 and the barcode reader R2 are independent hand-held devices severally. In another embodiment, the barcode reader R2 and the RF reader R1 can be integrated into a single hand-held device.

As illustrated FIG. 3, the RF reader R1 comprises a wireless RF module R11 for communicating with the wireless RF module 140 of the display electronic tagging 100 and a communication module R12, and the wireless RF module R11 for communicating with the communication module 210 of the set module 200. In present embodiment, the communication module R12 is a wireless communication module. In another embodiment, the communication module R12 is a wire communication module.

As illustrated FIG. 3, the barcode reader R2 comprises a communication module R21, and the communication module R21 of the barcode reader R2 is used for communicating with the communication module 210 of the set module 200.

One of several pairing methods is described in FIG. 4 below.

Figure 4:
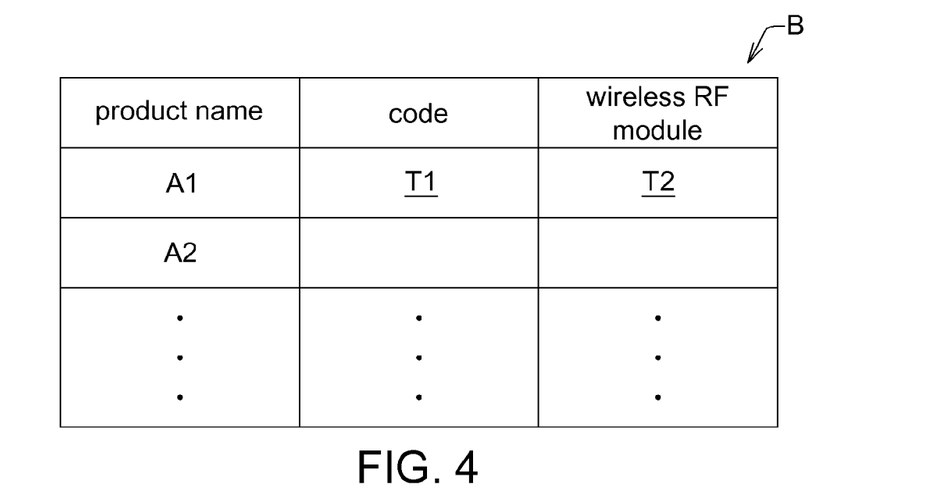
FIG. 4 shows a database diagram of the present embodiment.

Referring to FIG. 4, a database diagram of the present embodiment is shown. The set module 200 further comprises a database B. The database B comprises a product name field, a bar code field and a wireless RF module field. Though not illustrated, the database B may further a price field or other field relative to information about product. Take product A1 for example, a corresponding relationship between the product A1 and the bar code 130 is one to one. The corresponding relationship can be pre-filled in the product name field and the bar code field T1, wherein the bar code field T1 can be filled in the bar code recognition signal S2 or other appropriate data. After the bar code 130 and the wireless RF module 140 pair, the wireless RF field T2 corresponding to the product Al can be filled in the wireless RF module recognition signal S1 or other appropriate data. As a result, the bar code 103 and the wireless RF module 140 together correspond to the same product A1.

In present embodiment, the database B is stored in the storage unit 230 of the set module 200 or the RF reader R1. In another embodiment, the database B is stored in the storage unit 230 of the set module 200, and transmitted to the RF reader R1 through way of cable or wireless.

The wireless RF module recognition signal S1 and the bar code recognition signal S2 of above embodiments are transmitted to the set module 200 through different readers respectively. However, the wireless RF module recognition signal S1 and the bar code recognition signal S2 are transmitted to the set module 200 through the same reader. The FIGS. 4 and 5 are taken below for example.

Figure 5:
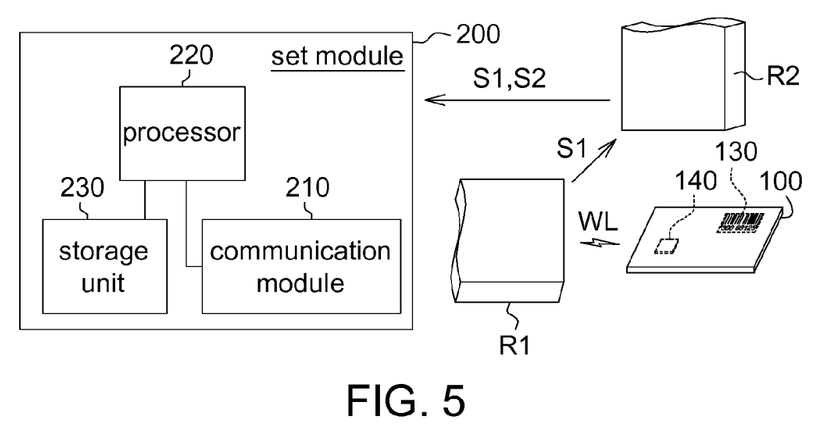
FIG. 5 shows a setting process diagram of the display electronic tagging of another embodiment.

Referring to FIG. 5, a setting process diagram of the display electronic tagging of another embodiment is shown.

Firstly, the RF reader R1 approaches the display electronic tagging 100; then, the wireless RF module 140 transmits the wireless RF module recognition signal S1 to the barcode reader R2; then, the barcode reader R2 reads the bar code 130 and generates the corresponding bar code recognition signal S2; then, barcode reader R2 transmits the wireless RF module recognition signal S1 and the bar code recognition signal S2 to the set module 200; then, the set module 200 pairs the barcode 130 and the wireless RF module 140, such that the wireless RF module 140 and the barcode 130 correspond to the same product.

Figure 6:
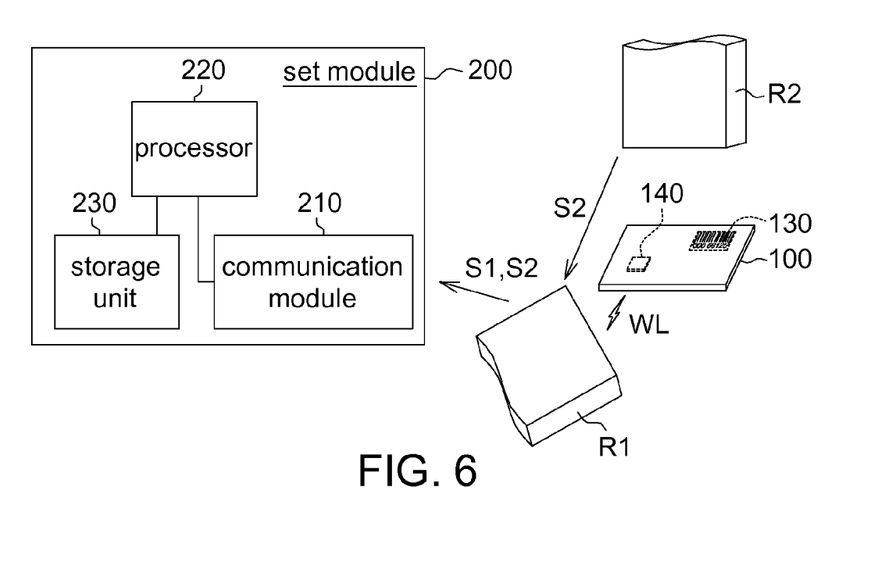
FIG. 6 shows a setting process diagram of the display electronic tagging of another embodiment.

Referring to FIG. 6, a setting process diagram of the display electronic tagging of another embodiment is shown.

Firstly, after the barcode reader R2 reads the barcode 130, the barcode reader R2 transmits the bar code recognition signal S2 to the wireless RF module 140; then, the wireless RF module 140 receives the bar code recognition signal S2; then, the barcode reader R2 approaches the display electronic tagging 100; then, the wireless RF module 140 transmits the wireless RF module recognition signal S1 and the bar code recognition signal S2 to the set module 200; then, the set module 200 pairs the bar code 130 and the wireless RF module 140, such that the wireless RF module 140 and the barcode 130 correspond the same product.

Figure 7:
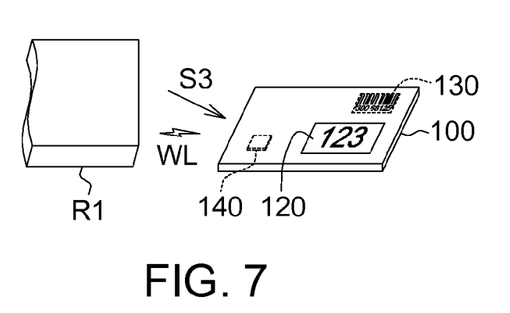
FIG. 7 shows a setting process diagram for a price of a display electronic tagging according to another embodiment.

Referring to FIG. 7, a setting process diagram for a price of a display electronic tagging according to another embodiment is shown.

Firstly, when the RF reader R1 approaches the display electronic tagging 100, the wireless RF reader R1 generates a price setting signal S3 to the wireless RF module 140 after the wireless RF reader R1 obtains the price of the product corresponding to the wireless module 140 according to a connection relationship between the price of the product and the wireless RF module 140 set up according to the database B, wherein the price setting signal S3 represents or carries a price information of the product, and meantime the power generator 150 generates electrical power according to the RF signal WL transmitted from the RF reader R1 to supply the display electronic tagging 100; then, the wireless RF module 140 receives the price setting signal S3 of the RF reader R1; then, the display device 120 displays the corresponding price according to the price setting signal S3, as a number "123" shown in FIG. 7.

During the process of the RF reader R1 setting the price, a updated database B stored in the RF reader R1, under the circumstances, the RF reader R1 can be disconnected from the set module 200; or, during the process of the RF reader R1 setting the price, the RF reader R1 connects with the set module 200 (via wire or wireless) for storing information to the database B of the set module 200 or reading information of the database B of the set module 200, under the circumstances, the updated database B is or not stored in the database B is allowed.

Figure 8:
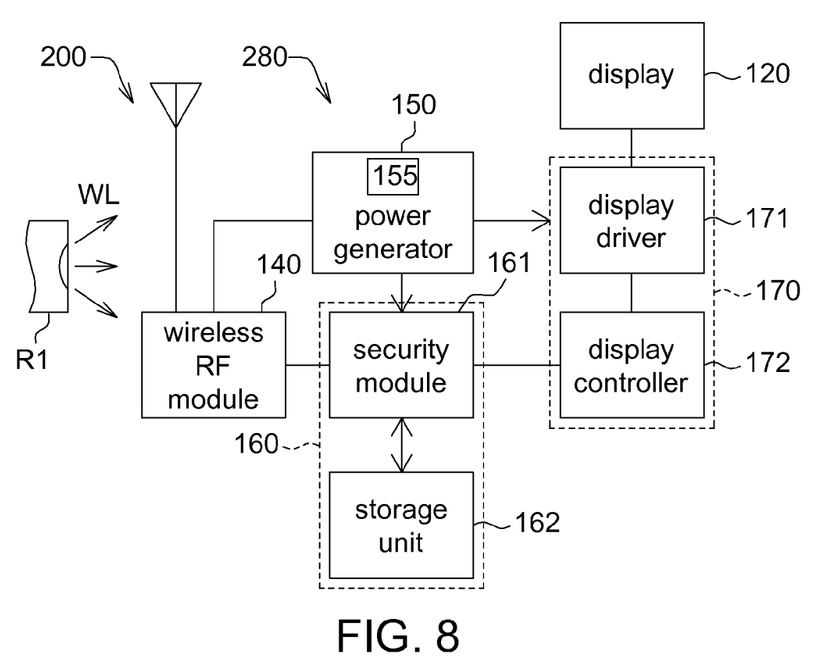
FIG. 8 shows a function block diagram of a display electronic tagging according to another embodiment.

Referring to FIG. 8, a function block diagram of a display electronic tagging according to another embodiment is shown. The display electronic tagging 200 comprises an encapsulating body 110, a display device 120, an electrical system 280 and a bar code 130. The electrical system 280, such as a flexible thin-type electronic system or an inflexible thin-type electrical system, may comprise the display device 120, the wireless RF module 140, the power generator 150, a capacitor 155, the smart card integrated circuit 160 and the display circuit 170. The smart card integrated circuit 160 and the display circuit 170 share all or a part of integrated circuits, or are disposed on single integrated circuit.

Figure 9:
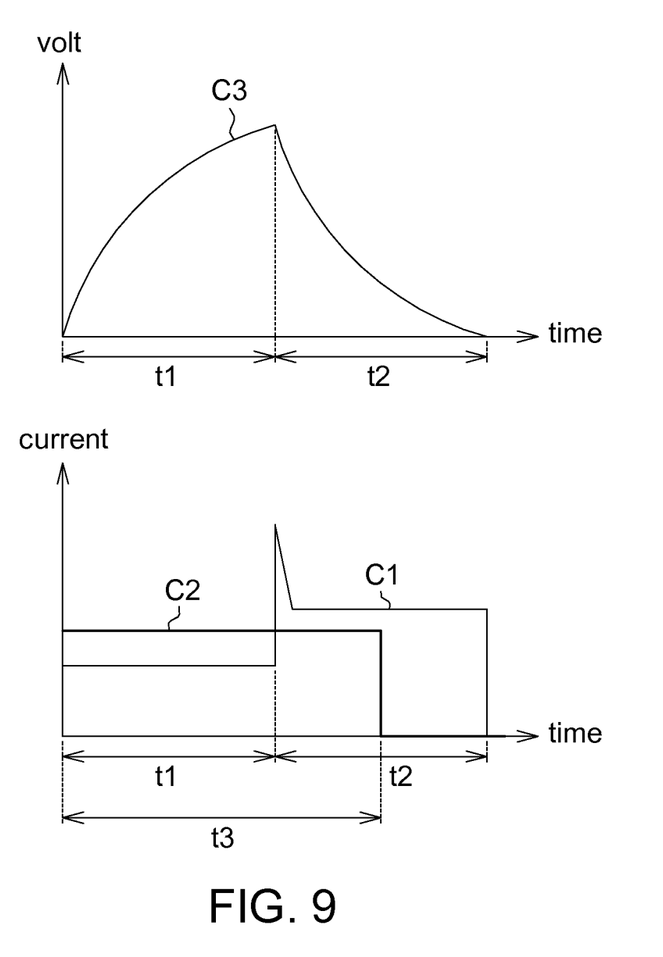
FIG. 9 shows an electrical characteristics diagram of an electromagnetic induction between the display electronic tagging and the exterior reader of FIG. 8.

Referring to FIG. 9, an electrical characteristics diagram of an electromagnetic induction between the display electronic tagging and the exterior reader of FIG. 8 is shown. A curve C1 represents a load current required by the display electronic tagging 200 to finish display work, a curve C2 represents an induction current generated by the display electronic tagging 200 and the reader, and a current difference $\Delta 1=C2-C1$ is defined. Within a time interval t1, the current difference $\Delta 1$ is positive, and the induction current can be supplied to the display electronic tagging 200 and a surplus of the induction current can be stored in the capacitor 155 additionally. After the time interval t1 (within the time interval t2), the current difference $\Delta l$ is negative because of the required load current going up; however, an insufficient current which has been stored in the capacitor 155 is provided to finish work. A time interval t3 represents an induction time of an electromagnetic induction between the display electronic tagging 200 and the exterior reader. After the time interval t3, the display electronic tagging 200 is away from the exterior reader to cause the induction curve C2 to be reduced to zero. A curve C3 represents a charge-discharge curve. As shown in FIG. 9, within the time interval t1, the current difference $\Delta l$ is larger than zero, and the electricity generated by the power generator 150 is stored in the capacitor 155. Within the time interval t2, the current difference $\Delta l$ is less than zero because of the required current for the display electronic tagging 200 being larger than the induction current generated by the power generator 150; however, the surplus current stored in the capacitor 155 within the time interval t1 can be provided to the display electronic tagging 200 to continues working (i.e. display a frame) within the time interval t2. In an embodiment, the capacitance of the capacitor 155 ranges between 0.1 and 20 microfarads (mF), and preferably ranges between 0.1 and 10 microfarads, such that even though the time interval t1 is very short, the sufficient current can be stored in the capacitor 155. In addition, the capacitor 155 can be additionally formed, and then be integrated into the power generator 150.

During the process of connection between the display electronic tagging 200 and the external card reader, some electricity generated by the power generator 150 is provided to maintain the normal operations of the display circuit 170. Meanwhile, some other electricity generated by the power generator 150 is stored in the capacitor 155. When the display electronic tagging 200 is outside the electromagnetic induction range of the external card reader so that the power generator 150 is unable to generate electricity, the electricity stored in the capacitor 155 is provided to maintain the normal operations of the display circuit 170.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display electronic tagging, comprising:
   a wireless RF module for receiving a RF signal;
   a display device electrically connecting to the wireless RF module for displaying a price for a product;
   an encapsulating body encapsulating the wireless RF module and the display device, wherein the display device is exposed from the encapsulating body;
   a bar code forming on the encapsulating body;
   a power generator electrically connecting the display device and the wireless RF module, and generating electrical power for the display electronic tagging according to the RF signal;
   wherein a bar code reader transmits a bar code recognition signal to a set module after the bar code reader reads the bar code, and after the bar code and the wireless RF module pair according to the bar code recognition signal and a wireless RF module recognition signal, the wireless RF module and the bar code correspond to the same product.

2. The display electronic tagging according to claim 1, further comprising:
   a product tag disposed on the encapsulating body, wherein the product tag corresponds a name of the product.

3. The display electronic tagging according to claim 1, wherein the encapsulating body is a flexible encapsulating body and the display device is a flexible display device, such that the display electronic tagging becomes a flexible display electronic tagging.

4. The display electronic tagging according to claim 1, wherein the encapsulating body is a hard encapsulating body, such that the display electronic tagging becomes an inflexible display electronic tagging.

5. A display electronic tagging, comprising:
   an electronic system comprising:
      a wireless RF module for receiving a RF signal;
      a display device electrically connecting to the wireless RF module for displaying a price for a product;
      a display circuit electrically connected to the display device;
      a power generator electrically connecting the display circuit and the wireless RF module and generating electricity by the RF signal within a time interval of the display electronic tagging inducting with an exterior reader; and
      a capacitor storing the electricity generated by the power generator for providing the display circuit with the stored electricity, such that the flexible display displays a frame, wherein the capacitance of the capacitor ranges between 0.1 and 20 microfarads (mF);
an encapsulating body encapsulating the electronic system and exposing the display device; and
a bar code forming on the encapsulating body;
wherein after the bar code and the wireless RF module pair according to a bar code recognition signal and a wireless RF module recognition signal, the wireless RF module and the bar code correspond to the same product.

6. The display electronic tagging according to claim 5, comprising:
a product tag disposed on the encapsulating body, wherein the product tag corresponds a name of the product.

7. The display electronic tagging according to claim 5, wherein the encapsulating body is a flexible encapsulating body and the display device is a flexible display device, such that the display electronic tagging becomes a flexible display electronic tagging.

8. The display electronic tagging according to claim 5, wherein the encapsulating body is a hard encapsulating body, such that the display electronic tagging becomes an inflexible display electronic tagging.

9. A setting management method, comprising:
providing a display electronic tagging, wherein the display electronic tagging comprises a wireless RF module, a display device, an encapsulating body and a bar code, the wireless RF module is used for receiving a RF signal, the display device is electrically connected to the wireless RF module for displaying a price for a product, the encapsulating body encapsulates the wireless RF module and the display device, the display device is exposed from the encapsulating body, and the bar code is formed on the encapsulating body;
pairing the bar code and the wireless RF module according to a bar code recognition signal and a wireless RF module recognition signal, such that the wireless RF module and the bar code correspond to the same product;
transmitting the bar code recognition signal to a set module after a bar code reader reads the bar code; and
generating electrical power for the display electronic tagging according to the RF signal from a RF reader.

10. The setting management method according to claim 9, further comprising:
the RF module transmitting the wireless RF module recognition signal to the bar code reader;
the bar code reader reading the bar code; and
the barcode reader transmitting the bar code recognition signal and the wireless RF module recognition signal to the set module after receiving the wireless RF module recognition signal.

11. The setting management method according to claim 9, further comprising:
the bar code reader transmitting the bar code recognition signal to the wireless RF module after reading the bar code;
the wireless module receiving the bar code recognition signal; and
the wireless module transmitting the bar code recognition signal and the wireless RF module recognition signal to a set module.

12. The setting management method according to claim 9, further comprising:
the wireless RF reader generating a price setting signal after obtaining the price of the product corresponding to the wireless module according to a connection relationship between the price of the product and the wireless RF module set up in a database;
the wireless RF module receiving the price setting signal from the wireless RF reader; and
the display device displaying the corresponding price according to the price setting signal.

13. A setting management method, comprising:
providing a display electronic tagging, wherein the display electronic tagging comprises an electrically system, an encapsulating body and a bar code, the electrically system comprises a wireless RF module, a display device, a display circuit, a power generator and a capacitor, the wireless RF module is used for receiving a RF signal, the display device is electrically connected to the wireless RF module for displaying a price for a product, the display circuit is electrically connected to the display device, the power generator electrically connects the display circuit and the wireless RF module, the encapsulating body encapsulates the electronic system and exposes the display device, and the barcode is formed on the encapsulating body;
pairing the bar code and the wireless RF module according to a bar code recognition signal and a wireless RF module recognition signal, such that the wireless RF module and the bar code correspond to the same product;
the power generator generating electricity by the RF signal within a time interval of the display electronic tagging inducting with an exterior reader and the capacitor storing the electricity generated by the power generator for providing the display circuit with the stored electricity, such that the flexible display displays a frame, wherein the capacitance of the capacitor ranges between 0.1 and 20 mF.

14. The setting management method according to claim 13, further comprising:
transmitting the bar code recognition signal to a set module after a bar code reader reads the bar code.

15. The setting management method according to claim 13, further comprising:
the RF module transmitting the wireless RF module recognition signal to the bar code reader;
the bar code reader reading the bar code; and
the barcode reader transmitting the bar code recognition signal and the wireless RF module recognition signal to a set module after receiving the wireless RF module recognition signal.

16. The setting management method according to claim 13, further comprising:
the bar code reader transmitting the bar code recognition signal to the wireless RF module after reading the bar code;
the wireless module receiving the bar code recognition signal; and
the wireless module transmitting the bar code recognition signal and the wireless RF module recognition signal to a set module.

17. The setting management method according to claim 13, further comprising:
the wireless RF reader generating a price setting signal after obtaining the price of the product corresponding to the wireless module according to a connection relationship between the price of the product and the wireless RF module set up in a database;
the wireless RF module receiving the price setting signal from the wireless RF reader; and
the display device displaying the corresponding price according to the price setting signal.

* * * * *